(12) United States Patent
Sakamoto et al.

(10) Patent No.: US 8,023,775 B2
(45) Date of Patent: Sep. 20, 2011

(54) SUPER FLAT OPTICAL FREQUENCY COMB SIGNAL GENERATOR

(75) Inventors: Takahide Sakamoto, Koganei (JP); Tetsuya Kawanishi, Koganei (JP); Masahiro Tsuchiya, Koganei (JP); Masayuki Izutsu, Koganei (JP)

(73) Assignee: National Institute of Information and Communications Technology, Tokyo (JP)

( * ) Notice: Subject to any disclaimer, the term of this patent is extended or adjusted under 35 U.S.C. 154(b) by 305 days.

(21) Appl. No.: 12/282,638

(22) PCT Filed: Sep. 22, 2006

(86) PCT No.: PCT/JP2006/318849
§ 371 (c)(1),
(2), (4) Date: Jan. 5, 2009

(87) PCT Pub. No.: WO2007/108148
PCT Pub. Date: Sep. 27, 2007

(65) Prior Publication Data
US 2009/0310900 A1    Dec. 17, 2009

(30) Foreign Application Priority Data
Mar. 15, 2006  (JP) .................. 2006-070076

(51) Int. Cl.
*G02F 1/225* (2006.01)
*G02F 1/01* (2006.01)
(52) U.S. Cl. .......... 385/3; 385/1; 398/186; 398/198
(58) Field of Classification Search ........... 385/1–10; 398/183, 186, 188, 198
See application file for complete search history.

(56) References Cited

U.S. PATENT DOCUMENTS

| 5,208,817 | A | * | 5/1993 | Kao et al. ................. 372/26 |
| 6,219,469 | B1 |  | 4/2001 | Minakata et al. |
| 6,556,736 | B2 | * | 4/2003 | Doerr et al. .............. 385/14 |
| 7,302,120 | B2 | * | 11/2007 | Sakane et al. .............. 385/3 |
| 2002/0048076 | A1 |  | 4/2002 | Kondo et al. |

(Continued)

FOREIGN PATENT DOCUMENTS

JP    08-029814 A    2/1996

(Continued)

OTHER PUBLICATIONS

John M. Payne, et. al., "Photonic Techniques for Local Oscillator Generation and Distribution in Millimeter-Wave Radio Astronomy"; MWP'02 (2002); pp. 9-12.

(Continued)

*Primary Examiner* — Uyen Chau N Le
*Assistant Examiner* — Michael Mooney
(74) *Attorney, Agent, or Firm* — Osha • Liang LLP

(57) ABSTRACT

An optical frequency COM generator generating an optical frequency COM having flat spectrum characteristics using a single modulator. The optical frequency COM generator has a drive signal system (11) and a bias signal system (14) which drive a first drive signal (9), a second drive signal (10) and bias signals (12, 13) to satisfy the following expression (I). $\Delta A + \Delta \theta = \pi/2$ (I). (where, $\Delta A$ and $\Delta \theta$ are defined as $\Delta A \equiv (A_1 - A_2)/2$ and $\Delta \theta \equiv (\theta_1 - \theta_2)/2$, respectively, $A_1$ and $A_2$ represent the amplitudes of the first and second drive signals when they are inputted to the electrodes of the first and second drive signals, respectively, and $\theta_1$ and $\theta_2$ represent the phases of bias voltages applied to first and second waveguides, respectively.)

6 Claims, 4 Drawing Sheets

Fig. 1

U.S. PATENT DOCUMENTS

| | | | |
|---|---|---|---|
| 2005/0008373 A1* | 1/2005 | Fujiwara et al. | 398/186 |
| 2006/0198581 A1* | 9/2006 | Belmonte et al. | 385/40 |

FOREIGN PATENT DOCUMENTS

| | | |
|---|---|---|
| JP | 10-133159 A | 5/1998 |
| JP | 11-183946 A | 7/1999 |
| JP | 11-295674 A | 10/1999 |
| JP | 2000-47159 A | 2/2000 |
| JP | 2000-267056 A | 9/2000 |
| JP | 2002-040381 A | 2/2002 |
| JP | 2002-082323 A | 3/2002 |
| JP | 2002-156670 A | 5/2002 |
| JP | 2002-169133 A | 6/2002 |
| JP | 2002-268025 A | 9/2002 |
| JP | 2004-245750 A | 9/2004 |
| JP | 2006-047781 A | 2/2006 |

OTHER PUBLICATIONS

Takahide Sakamoto, et. al., "Photo-electronic Oscillator for Frequency Comb Generation Fed Back with Asymmetric-filtered Deeply Phase-modulated Light"; MWP'02, MC15, (2004); pp. 93-96.

Masaki Sugiyama, et. al., "Driver-less 40 Gb/s LiNbO3 Modulator with Su-1 V Drive Voltage"; OFC'02, FB6 (2002); pp. FB6-1-FB6-4.

Patent Abstracts of Japan English abstract for Japan Patent Publication No. JP2002-268025, published Sep. 18, 2002 (1 page).

Patent Abstracts of Japan English abstract for Japan Patent Publication No. JP11-295674, published Oct. 29, 1999 (1 page).

Patent Abstracts of Japan English abstract for Japan Patent Publication No. JP2002-169133, published Jun. 14, 2002 (1 page).

Patent Abstracts of Japan English abstract for Japan Patent Publication No. JP2002-040381, published Feb. 6, 2002 (1 page).

Patent Abstracts of Japan English abstract for Japan Patent Publication No. JP2000-267056, published Sep. 29, 2000 (1 page).

Tetsuya Kawanishi, et. al., "Optical frequency comb generator using optical fiber loops with single-sideband modulation"; IEICE Electronics Express, vol. 1, No. 8; pp. 217-221, [Published Jul. 25, 2004].

Tetsuya Kawanishi, et. al., "Resonant-type optical modulator with planar structures", Technical Report of IEICE, LQE2001-3 (May 2001); pp. 13-18.

Hiroshi Nishihara, et. al., "Optical Integrated Circuits" (updated version), with English translation (4 pages), [Published 1989].

Hiroshi Nishihara, et. al., "Optical Integrated Circuits", Chapter 26, McGraw-Hill optical and electro-optical engineering series (1989); ISBN: 002949091X (38 pages).

Patent Abstracts of Japan English abstract for Japan Patent Publication No. JP2000-47159, published Feb. 18, 2000 (1 page).

International Search Report dated Oct. 24, 2006, issued by the Japanese Patent Office in PCT/JP2006/318849 (with English translation) (4 pages).

esp@cenet Abstract (English translation) of JP-2002-156670 (A) (1 page).

esp@cenet Abstract (English translation) of JP-2002-082323 (A) (1 page).

esp@cenet Abstract (English translation) of JP-11183946 (A) (1 page).

esp@cenet Abstract (English translation) of JP-8029814 (A) (1 page).

esp@cenet Abstract (English translation) of JP-2006-047781 (A) (1 page).

esp@cenet Abstract (English translation) of JP-2004-245750 (A) (1 page).

\* cited by examiner

Fig. 4
(a)
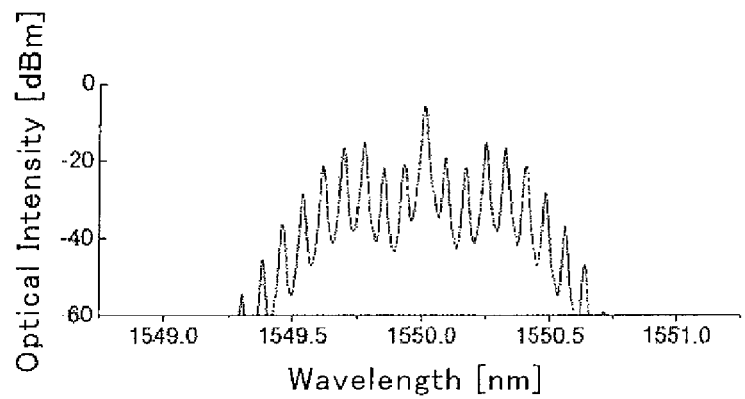
(b)
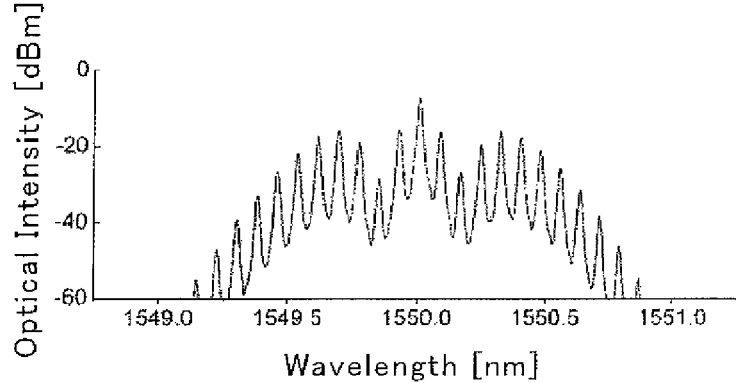
(c)
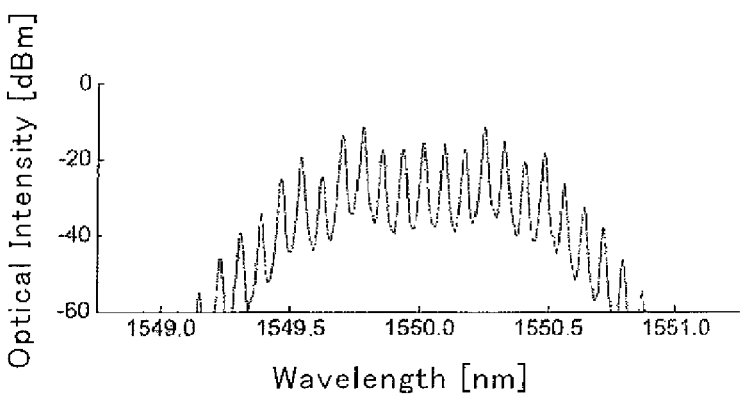

SUPER FLAT OPTICAL FREQUENCY COMB SIGNAL GENERATOR

FIELD OF THE INVENTION

The present invention relates generally to an optical frequency comb signal generator which generates super flat optical frequency comb signals using a Mach-Zhender modulator.

More specifically, the present invention relates to an optical frequency comb signal generator which comprises a conventional Mach-Zehnder modulator capable of generating an optical frequency comb with excellent spectral flatness. The modulator is asymmetrically dual driven by large amplitude sinusoidal signals with different amplitudes. The driving condition to obtain spectral flatness is analytically derived and optimized, yielding a simple formula. This formula also predicts the conversion efficiency and bandwidth of the generated frequency comb.

BACKGROUND OF ART

Recently, many people study an optical frequency comb signal generator which can generate plurality of optical frequency components with same frequency intervals simultaneously. An optical frequency comb signal generator, which can generates an optical frequency comb signal, can be used as one component of short pulse generation apparatus for ultra high speed optical communication or optical measurement. Further, an optical frequency comb signal generator is investigated its applications such as wideband multiwavelength laser sources, ultrashort pulse generation, arbitrary-waveform generation, and optical frequency reference (W. D. Jemison et al., MWP'01, pp. 169-172, 2001). An optical frequency comb signal generator is investigated to generate control signals of array antenna for space measurement system like an astronomical telescope (J. M. Payne and W. P. Shillue, MWP'02, pp. 9-12, 2002).

An optical frequency comb signal generator which has a mode lock laser using a semiconductor or an optical fiber, and an optical frequency comb signal generator which utilizes optical modulation technique using a $LiNbO_3$ modulator are known in the art (e.g. non-patent documents 1 to 3).

Especially, a $LiNbO_3$ modulator is suitable for the technologies because the bandwidth of its EO effect is much wider than that of the driving radio-frequency (rf) signal and tolerant to its large-amplitude operation. However, it is difficult to flatly generate an optical frequency comb using the EO modulation technique because the intensity of each mode is governed by Bessel functions and highly depends on wavelength.

Preceding reports have thus far solved this problem by using a two-stage modulator, where a phase modulator and an intensity modulator are cascaded in tandem. The optical frequency comb signal generator of the technology drives both of the optical phase modulator and the optical intensity modulator using the synchronize signals having the same frequency. The optical phase modulator is driven by large amplitude signals to generate high order components. Then the optical intensity modulator modulates intensity of the components. Sideband components generated from each of the frequency components of phase modulated signals interfere with neighboring order frequency component to lessen the deviation of the optical signal. Further, in time axis, nonlinear chirped components of the phase modulated light are selectively generated by controlling the optical intensity.

However the conventional optical frequency comb signal generator has a drawback that it requires the synchronized driving for two optical modulators connected in tandem. Thus the structure of the optical frequency comb signal generator become complex.

REFERENCES

Non-patent document 1: M. Sugiyama et al., OFC'02, FB6, 2002.
Non-patent document 2: T. Sakamoto et al., MWP'04, MC16, 2004.
Non-patent document 3: T. Kawanishi et al., IEICE Electron Express, Vol. 1, pp. 217-221, 2004

DISCLOSURE OF INVENTION

Problems to be Solved by the Invention

It is an object of the present invention to provide an optical frequency comb signal generator, using single-stage optical modulator, preferably without using a phase modulator but only using a single-stage Mach-Zhender modulator, which is capable of generating frequency comb signals with good spectral flatness, each of the comb signals having frequency components at regular frequency intervals.

It is another object of the present invention to provide an apparatus for generating optical pulse comprising the optical frequency comb signal generator.

Means for Solving the Problem

The above objects are attained by the claimed apparatus and claimed method. The present invention basically relates to an apparatus for an optical frequency comb signals comprising a single-stage Mach-Zhender modulator which drives driving signal in a predetermined condition. Then the apparatus is cable of generating frequency comb signals with good spectral flatness. Optical phase shifter is generally used for modulating phase of inputted optical signals. In fact, the optical phase shifter outputs not only an optical signal the phase of which is modulated at a predetermined amount but also a lot of optical component having various frequencies as a noise. The intensity of the noise signals, various frequency components, is in accordance with Bessel function. A Mach-Zhender modulator comprises two optical phase modulator on both of the arms. To control the noise signals therefore make it possible to obtain frequency comb signals with good spectral flatness even using a single-stage Mach-Zhender modulator.

The first aspect of the present invention is directed to an optical frequency comb signal generator. The apparatus comprises a wave-guide portion (8), a driving signal system (11), and a bias signal system (14). The wave-guide portion comprises an optical input port (2), a branching port (3), a first wave-guide (4), a second wave-guide (5), and a couple portion (6). The branching port (3) is configured to branch light from the optical input port. On the first wave-guide (4), one of lights branched by the branching port (3) propagates. On the second wave-guide (5), other light branched by the branching port (3) propagates. The couple portion (6) couples a light signal outputted from the first wave-guide and a light outputted from the second wave-guide (5). The driving signal system (11) is configured to obtain a first driving signal (9) and a second driving signal (10). The first driving signal (9) drives the first wave-guide. The second driving signal (10) drives the second wave-guide. The bias signal system (14) is configured to obtain bias signals (12, 13) added to the first wave-guide and the second wave-guide. The driving signal system (11) and the bias signal system (14) drive the first driving signal (9), the second driving signal (10) and the bias signals (12, 13) in accordance with the following equation (I).

$$\Delta A + \Delta \theta = \pi/2 \tag{I}$$

(wherein the $\Delta A$ and the $\Delta \theta$ are $(A_1-A_2)/2$, and $(\theta_1-\theta_2)/2$, respectively; $A_1$ and $A_2$ are amplitude of optical phase shift signals of the first driving signal and the second driving signal, respectively; $\theta_1$ and $\theta_2$ are the optical phase shift induced by difference of wavelength and bias signal within the first wave-guide and the second wave-guide, respectively.)

Hereinafter, the amplitude of optical phase shift signals of the first driving signal, $A_1$, is also called as the amplitude of the first driving signal. Further, the amplitude of optical phase shift signals of the second driving signal, $A_2$, is also called as the amplitude of the second driving signal. The term, "amplitude of a driving signal" means the amplitude of optical phase shift induced by the driving signal in accordance with the context.

As explained later, driving in accordance with the above equation (I), the signal generator can generate optical frequency comb signal with spectral flatness because optical signals from both of phase modulators that will be coupled are complimented each other. Wave-guide acts as a phase modulator when driving signal is added to the electrode.

A preferred embodiment of the first aspect of the present invention relates to the optical frequency comb signal generator in accordance with the above described apparatus wherein the driving signal system (11) and the bias signal system (14) drive the first driving signal (9), the second driving signal (10) and the bias signals (12, 13) in accordance with the following equation (II).

$$\Delta A = \Delta \theta = \pi/4 \tag{II}$$

(where $\Delta A$ and $\Delta \theta$ are the same as above)

The signal generator can generate optical frequency comb signal with spectral flatness because equation (II) meets the equation (I). Further, as explained later, when driving in accordance with the equation (II), the signal generator can generate optical frequency comb signal with spectral flatness efficiently.

A preferred embodiment of the first aspect of the present invention relates to any of the above described optical frequency comb signal generator wherein amplitude of the first driving signal, $A_1$, and amplitude of the second driving signal, $A_2$, are different.

Generally, a dual-drive optical modulator uses two driving signals with the same amplitude. The modulators are asymmetrically dual driven by large amplitude sinusoidal signals with different amplitudes so that the signal generator can generate an optical frequency comb signal with spectral flatness.

A preferred embodiment of the first aspect of the present invention relates to any one of the optical frequency comb signal generator as described above wherein the wave-guide portion (8) comprises a Mach-Zhender wave-guide.

A Mach-Zhender waveguide is known and optical modulator which comprises Mach-Zhender waveguide(s) and a driving signal system are also known as a Mach-Zhender modulator. Thus a skilled person can easily manufacture the optical frequency comb signal generator which comprises a Mach-Zhender waveguide using conventional Mach-Zhender waveguide and a driving signal system. Two waveguides that compose a part of Mach-Zhender waveguide, the part is after split portion, is called as arm, respectively. Mach-Zhender wave-guide composes wave-guide in hexagon shape and is configured to comprise two phase modulators in parallel with each other.

The amounts of optical phase shift in each arms of Mach-Zhender modulator are different. Thus, frequency period against induced voltage in each arms are also different. The present invention basically arrange driving voltage to make the difference of frequency phase between the two arms becomes 90 degrees so that the synthesized vector of each frequency component of the optical comb signal be prescribed amount. Thus, the present invention is capable of lessen frequency dependency of optical intensity for the synthesized optical spectrum and thus is capable of obtain optical frequency comb signals with spectral flatness.

The second aspect of the present invention is directed to a method for generating an optical frequency comb signal by means of an optical frequency comb signal generator. The apparatus comprises a wave-guide portion (8), a driving signal system (11), and a bias signal system (14). The wave-guide portion comprises an optical input port (2), a branching port (3), a first wave-guide (4), a second wave-guide (5), and a couple portion (6). The branching port (3) is configured to branch light from the optical input port. On the first wave-guide (4), one of lights branched by the branching port (3) propagates. On the second wave-guide (5), other light branched by the branching port (3) propagates. The couple portion (6) couples a light signal outputted from the first wave-guide and a light outputted from the second wave-guide (5). The driving signal system (11) is configured to obtain a first driving signal (9) and a second driving signal (10). The first driving signal (9) drives the first wave-guide. The second driving signal (10) drives the second wave-guide. The bias signal system (14) is configured to obtain bias signals (12, 13) added to the first wave-guide and the second wave-guide. The driving signal system (11) and the bias signal system (14) drive the first driving signal (9), the second driving signal (10) and the bias signals (12, 13) in accordance with the following equation (I).

$$\Delta A + \Delta \theta = \pi/2 \tag{2}$$

(wherein the $\Delta A$ and the $\Delta \theta$ are $(A_1-A_2)/2$, and $(\theta_1-\theta_2)/2$ respectively, $A_1$ and $A_2$ are amplitude of optical phase shift signals of the first driving signal and the second driving signal respectively, $\theta_1$ and $\theta_2$ are the optical phase shift induced by difference of wavelength and bias signal within the first wave-guide and the second wave-guide respectively.)

A preferred embodiment of the second aspect of the present invention relates to the above described method wherein the driving signal system (11) and the bias signal system (14) drive the first driving signal (9), the second driving signal (10) and the bias signals (12, 13) in accordance with the following equation (II).

$$\Delta A = \Delta \theta = \pi/4 \tag{II}$$

(where $\Delta A$ and $\Delta \theta$ are the same as above)

A preferred embodiment of the second aspect of the present invention relates to any of the above described method wherein amplitude of the first driving signal, $A_1$, and amplitude of the second driving signal, $A_2$, are different.

A preferred embodiment of the second aspect of the present invention relates to any one of the method as described above wherein the wave-guide portion (8) comprises a Mach-Zhender wave-guide.

The third aspect of the present invention is directed to an optical pulse generator comprises any of the above described optical frequency comb signal generator. The apparatus for generating optical pulse comprises an optical frequency comb signal generator, and means for controlling optical phase. The optical frequency comb signal generator comprises a wave-guide portion (8), a driving signal system (11), and a bias signal system (14). The wave-guide portion comprises an optical input port (2), a branching port (3), a first wave-guide (4), a second wave-guide (5), and a couple portion (6). The branching port (3) is configured to branch light from the optical input port. On the first wave-guide (4), one of lights branched by the branching port (3) propagates. On the second wave-guide (5), other light branched by the branching port (3) propagates. The couple portion (6) couples a light signal outputted from the first wave-guide and a light outputted from the second wave-guide (5). The driving signal system (11) is configured to obtain a first driving signal (9) and a second driving signal (10). The first driving signal (9) drives the first wave-guide. The second driving signal (10) drives the second wave-guide. The bias signal system (14) is configured to obtain bias signals (12, 13) added to the first wave-guide and the second wave-guide. The driving signal system (11) and the bias signal system (14) drive the first driving signal (9), the second driving signal (10) and the bias signals (12, 13) in accordance with the following equation (I).

$$\Delta A + \Delta \theta = \pi/2 \qquad (I)$$

(wherein the $\Delta A$ and the $\Delta \theta$ are $(A_1-A_2)/2$, and $(\theta_1-\theta_2)/2$ respectively, $A_1$ and $A_2$ are amplitude of optical phase shift signals of the first driving signal and the second driving signal respectively, $\theta_1$ and $\theta_2$ are the optical phase shift induced by difference of wavelength and bias signal within the first wave-guide and the second wave-guide respectively.)

The means for controlling optical phase controls phase of each of frequency components which composes the optical frequency comb signal.

A preferred embodiment of the third aspect of the present invention is directed to the an optical pulse generator which controls not only phase of each component composing the optical frequency comb signals but also controls intensity of each component composing the optical frequency comb signals.

The apparatus for generating optical pulse of this embodiment basically comprises an optical frequency comb signal generator, means for controlling optical phase and means for controlling optical intensity. The optical frequency comb signal generator comprises a wave-guide portion (8), a driving signal system (11), and a bias signal system (14). The wave-guide portion comprises an optical input port (2), a branching port (3), a first wave-guide (4), a second wave-guide (5), and a couple portion (6). The branching port (3) is configured to branch light from the optical input port. On the first wave-guide (4), one of lights branched by the branching port (3) propagates. On the second wave-guide (5), other light branched by the branching port (3) propagates. The couple portion (6) couples a light signal outputted from the first wave-guide and a light outputted from the second wave-guide (5). The driving signal system (11) is configured to obtain a first driving signal (9) and a second driving signal (10). The first driving signal (9) drives the first wave-guide. The second driving signal (10) drives the second wave-guide. The bias signal system (14) is configured to obtain bias signals (12, 13) added to the first wave-guide and the second wave-guide. The driving signal system (11) and the bias signal system (14) drive the first driving signal (9), the second driving signal (10) and the bias signals (12, 13) in accordance with the following equation (I).

$$\Delta A + \Delta \theta = \pi/2 \qquad (I)$$

(wherein the $\Delta A$ and the $\Delta \theta$ are $(A_1-A_2)/2$, and $(\theta_1-\theta_2)/2$ respectively, $A_1$ and $A_2$ are amplitude of optical phase shift signals of the first driving signal and the second driving signal respectively, $\theta_1$ and $\theta_2$ are the optical phase shift induced by difference of wavelength and bias signal within the first wave-guide and the second wave-guide respectively.)

The means for controlling optical phase controls phase of each of frequency components which composes the optical frequency comb signal. The means for controlling optical intensity controls intensity of each of frequency components which composes the optical frequency comb signal.

Meritorious Effect

The present invention can provide an optical frequency comb signal generator, using single-stage optical modulator, which is capable of generating frequency comb signals with good spectral flatness, by means of droving the optical modulator in a predetermined condition. It makes system structure simple and easy to drive compared with a conventional optical frequency comb signal generator which has a phase modulators or two Mach-Zhender modulators because the apparatus of the present invention does not require driving two modulators using synchronized signals.

Because the optical pulse generator of the present invention has the above described optical frequency comb signal generator, the present invention can provide the optical pulse generator which has a meritorious effect as explained above.

BRIEF DESCRIPTION OF THE DRAWINGS

FIG. 4 is a graph to show the spectrum of optical frequency comb signal obtained by the Example 1. FIG. 4A shows the output signal under the condition of $\Delta\theta=\pi/4$ and driving only RF-a. FIG. 4B shows the output signal under the condition of $\Delta\theta=\pi/4$ and driving only RF-b. FIG. 4C shows the output signal under the condition of $\Delta A=\Delta\theta=\pi/4$ and driving both RF-a and RF-b.

EXPLANATION OF ELEMENT NUMERALS

1: optical frequency comb signal generator;
2: input port;
3: branching port;
4: the first wave-guide;
5: the second wave-guide;
6: coupled portion;
7: output portion;
8: wave-guide part;
9: the first driving signal;
10: the second driving signal;
11: driving signal system;
12: bias signal;
13: bias signal;
14: bias signal system

BEST MODE FOR CARRYING OUT THE INVENTION

Optical Frequency Comb Generator

Figure 1:
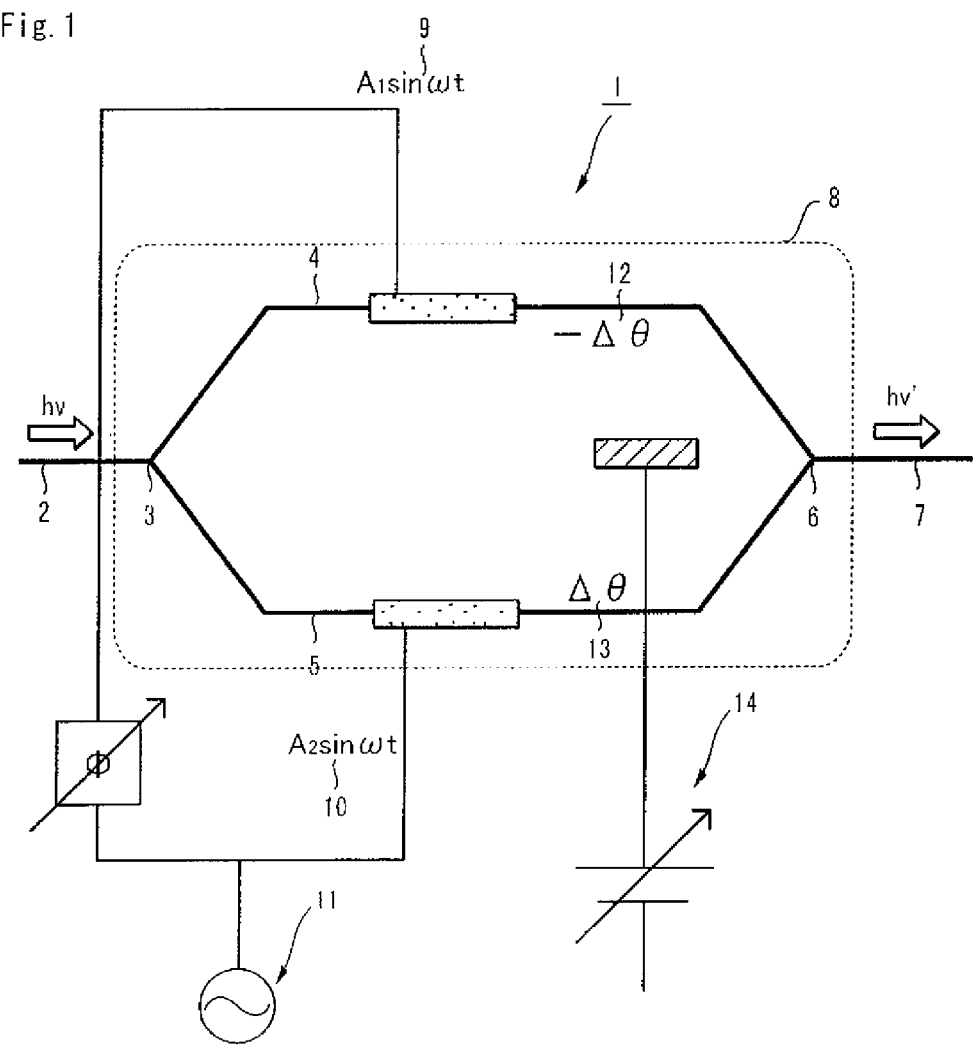
FIG. 1 is a schematic diagram of the optical frequency comb signal generator of the present invention.

The optical frequency comb signal generator of the present invention is explained using figures attached hereto. FIG. 1 depicts the general view of the optical frequency comb signal generator of the present invention. As shown in the FIG. 1, the optical frequency comb signal generator comprises a wave-guide portion (8), a driving signal system (11), and a bias signal system (14). The wave-guide portion comprises an optical input port (2), a branching port (3), a first wave-guide (4), a second wave-guide (5), and a couple portion (6). The branching port (3) is configured to branch light from the optical input port. On the first wave-guide (4), one of lights branched by the branching port (3) propagates. On the second wave-guide (5), other light branched by the branching port (3) propagates. The couple portion (6) couples a light signal outputted from the first wave-guide and a light outputted from the second wave-guide (5). The driving signal system (11) is configured to obtain a first driving signal (9) and a second driving signal (10). The first driving signal (9) drives the first wave-guide. The second driving signal (10) drives the second wave-guide.

The bias signal system (14) is configured to obtain bias signals (12, 13) added to the first wave-guide and the second wave-guide. The driving signal system (11) and the bias signal system (14) drive the first driving signal (9), the second driving signal (10) and the bias signals (12, 13) in accordance with the following equation (I).

$$\Delta A + \Delta \theta = \pi/2 \quad (I)$$

(wherein the $\Delta A$ and the $\Delta \theta$ are $(A_1-A_2)/2$, and $(\theta_1-\theta_2)/2$ respectively, $A_1$ and $A_2$ are amplitude of optical phase shift signals of the first driving signal and the second driving signal respectively, $\theta_1$ and $\theta_2$ are the optical phase shift induced by difference of wavelength and bias signal within the first wave-guide and the second wave-guide respectively.)

In other words, the optical frequency comb signal generator comprises the driving signal system (11) and the bias signal system (14) that drive the first driving signal (9), the second driving signal (10) and the bias signals (12, 13) in accordance with the equation (I). The drive control is attained by means of a computer included in or connected to the signal systems of the apparatus.

As explained later, driving the apparatus to meet the above equation (I) makes optical signals outputted from two phase modulators that will be coupled complement each other so that the apparatus can generate an optical frequency comb signal with spectral flatness.

A preferred embodiment of the first aspect of the present invention relates to the optical frequency comb signal generator in accordance with the above described apparatus wherein the driving signal system (11) and the bias signal system (14) drive the first driving signal (9), the second driving signal (10) and the bias signals (12, 13) in accordance with the following equation (II).

$$\Delta A = \Delta \theta = \pi/4 \quad (II)$$

(where $\Delta A$ and $\Delta \theta$ are the same as above)

In other words, the optical frequency comb generator of this embodiment comprises driving signal system (11) and bias signal system (14) which can drive the first driving signal (9), the second driving signal (10) and bias signal (12, 13) based on the equation (II).

The signal generator can generate optical frequency comb signal with spectral flatness because equation (II) meets the equation (I). Further, as explained later, when driving in accordance with the equation (II), the signal generator can generate optical frequency comb signal with spectral flatness efficiently.

A preferred embodiment of the first aspect of the present invention relates to any of the above described optical frequency comb signal generator wherein amplitude of the first driving signal, $A_1$, and amplitude of the second driving signal, $A_2$, are different.

Large amplitude of the driving signal is preferred to obtain a flat optical frequency comb spectrum in condition of the equation (I). Thus, examples of amplitude of driving signal are more than $\pi$, preferably more than 2 pai, more preferably more than 3 pai. It is preferred that the amplitude of the two driving signal is different. Thus the example of the difference of the amplitude are from 0 to pai, preferably 0.5 pai or preferably from 0 to 0.25 pai.

Generally, a dual-drive optical modulator uses two driving signals with the same amplitude. The modulators are asymmetrically dual driven by large amplitude sinusoidal signals with different amplitudes so that the signal generator can generate an optical frequency comb signal with spectral flatness.

A preferred embodiment of the first aspect of the present invention relates to any one of the optical frequency comb signal generator as described above wherein the wave-guide portion (8) comprises a Mach-Zhender wave-guide.

A Mach-Zhender waveguide is known and optical modulator which comprises Mach-Zhender waveguide(s) and a driving signal system are also known as a Mach-Zhender modulator. Thus a skilled person can easily manufacture the optical frequency comb signal generator which comprises a Mach-Zhender waveguide using conventional Mach-Zhender waveguide and a driving signal system. Two waveguides that compose a part of Mach-Zhender waveguide, the part is after split portion, is called as arm, respectively. Mach-Zhender wave-guide composes wave-guide in hexagon shape and is configured to comprise two phase modulators in parallel with each other.

The amounts of optical phase shift in each arms of Mach-Zhender modulator are different. Thus, frequency period against induced voltage in each arms are also different. The present invention basically arrange driving voltage to make the difference of frequency phase between the two arms becomes 90 degrees so that the synthesized vector of each frequency component of the optical comb signal be prescribed amount. Thus, the present invention is capable of lessen frequency dependency of optical intensity for the synthesized optical spectrum and thus is capable of obtain optical frequency comb signals with spectral flatness. Because the optical frequency comb generator can generate optical pulse signals in requested frequency zone, the optical frequency comb generator can become an optical pulse generator which can generate optical signals with plurality of frequency with high quality. Thus the present invention can provide a optical pulse generator that can generate optical pulses with plurality of frequency that comprise the above described optical frequency comb generator.

Explanation of Each Component

Each elements of the optical frequency comb signal generator of the present invention is explained bellow.

The example of the light source for the optical frequency comb signal generator of the present invention is the continuous wave, CW, light source and distributed feedback, DFB, laser. The DFB laser with settled output power is preferred as the light source because it capable of selecting single wavelength efficiently. The example of the optical band is not only C-band but also L-band and S-band which is shorter wave part then L-band. The example of intensity of light is from 1 mW to 50 mW.

It may be used already known wave-guide for the waveguide of the optical frequency comb signal generator of the present invention. We explain the optical frequency comb signal generator using Mach-Zhender modulator because the preferred optical modulator of the present invention is directed to Mach-Zhender modulator. A Mach-Zhender waveguide and an electrode are generally provided on a substrate. The material of a substrate and each waveguide is not specifically limited if light can propagate through the substrate. For example, a lithium niobate waveguide with a Ti diffusion may be formed on an LN substrate, and a silicon dioxide ($SiO_2$) waveguide may be formed on a silicon (Si) substrate. Also, an optical semiconductor waveguide such as an InGaAsP waveguide (a GaAlAs waveguide) formed on an indium phosphide substrate (a GaAs substrate) may be used. The substrate is preferably formed of lithium niobate ($LiNbO_3$:LN) and cut out in a direction orthogonal to the X-axis (X-cut), and light is propagated in a Z-axis direction (Z-axis propagation). This is because a low-power-consumption drive and a superior response speed can be achieved due to dynamic electrooptic effect. An optical waveguide is formed in the surface portion of a substrate having an X-cut plane (YZ plane), and guided light propagates along the Z-axis (the optic axis). A lithium niobate substrate except the X-cut may be used. As a substrate, it is possible to use a material of a one-axis crystal having a crystal system such as a trigonal system and a hexagonal system and having electro optical effect or a material in which a point group of a crystal is $C_{3V}$, $C_3$, $D_3$, $C_{3h}$, and $D_{3h}$. These materials have a refractive index adjusting function in which a change in the refractive index due to the application of an electric field has a different sign depending on a mode of a propagation light. As a specific example, lithium tantalite oxide ($LiTO_3$:LT), $\beta$-$BaB_2O_4$ (abbr. BBO), $LiIO_3$ and the like can be used other than lithium niobate.

The optical frequency comb signal generator of the present invention comprises a driving signal system (11). The driving signal system generates the first driving signal (9) and the second driving signal (10). The first driving signal drives the first wave-guide and the second driving signal drives the second wave-guide. The driving signal system (11) comprises electric signal system and the modulation electrodes. The electric signal system has an electric power signal source. The modulation electrodes are electrodes on which the first driving signal and the second driving signal are added. Both of arms may comprise a modulation electrode. However, one modulation electrode may act two modulation electrodes by adding two kinds of driving signal to the modulation electrode. The modulation electrodes are, for example, traveling-wave-type electrodes or resonant-type electrodes. Resonant-type electrodes are used when the generated optical spectrum has optical signals at predetermined frequency intervals. Traveling-wave-type electrodes are preferred when the amount of the frequency interval may change. The example of the modulation signal which is added the two arms is a signal the repetition frequency of which has predetermined period, and more specifically, is a sinusoidal wave. The optical frequency comb signal generator of the present invention generates an optical frequency comb signal which contains optical signals the frequency thereof alters at intervals of frequency $\omega$ when the modulation signal with frequency $\omega$ is added; the frequency $\omega$ is a frequency of periodical signals like a sinusoidal wave. If the interval of spectrum which composes the optical frequency comb signal may change, the repetitious frequency of the driving signal may not continuous. For example, the driving signal the frequency of which changes depend on time may be used.

The modulation electrodes are preferably connected to a high frequency signal source. The high frequency signal source is a device for controlling a signal transmitted to the modulation electrodes. As the high frequency signal source, known high frequency signal sources can be adopted. As frequencies ($f_m$) of the high frequency signal inputted to the modulation electrodes is, e.g. 1 GHz to 100 GHz. The example of an output of a high frequency signal source is a sinusoidal wave having a fixed frequency. A phase modulator is preferably provided at an output of this high frequency signal source in order to be able to control a phase of an output signal.

The modulation electrodes are composed of e.g., gold, platinum or the like. The example of the width of the modulation electrodes, is 1 μm to 10 μm, and specifically, is 5 μm. The example of the length of the modulation electrodes are 0.1 times to 0.9 times the wavelength of the modulating signal ($f_m$), 0.18 to 0.22 times, or 0.67 to 0.70 times. And more preferably, it is shorter than the resonant point of the modulating signal by 20 to 25%. This is because with such a length, the synthesized impedance remains in an appropriate region. The example of the more specific length of the modulation electrodes are 3250 μm. Hereinafter, a resonant-type electrode and a traveling-wave-type electrode are described.

A resonant-type optical electrode (resonant-type optical modulator) is an electrode for performing a modulation by using resonance of a modulating signal. A known resonant-type electrode such as those described in the Japanese Patent Application Laid-Open 2002-268025, and Tetsuya Kawanishi, Satoshi Oikawa, Masayuki Izutsu, "Planar Structure Resonant-type Optical Modulator", TECHNICAL REPORT OF IEICE, LQE2001-3 (2001-05) can be adopted as a resonant-type electrode.

A traveling-wave-type electrode (traveling-wave-type optical modulator) is an electrode (modulator) for modulating light while guiding waves so that a lightwave and an electric signal are guided in the same direction (e.g. Hiroshi Nishihara, Masamitsu Haruna, Toshiaki Suhara, "Optical Integrated Circuit" (revised and updated edition), Ohmsha, pp. 119-120). A known traveling-wave-type electrode such as those described in Japan Patent Application Laid-Open Nos. 11-295674, 2002-169133, 2002-40381, 2000-267056, 2000-471159, and 10-133159, for example, can be adopted as a traveling-wave-type electrode.

As a preferable traveling-wave-type electrode, a so-called symmetrical-type earth electrode arrangement (one provided with at least a pair of earth electrodes on both sides of a traveling-wave-type signal electrode) is adopted. Thus, by symmetrically arranging the earth electrodes on both sides of the signal electrode, a high frequency wave outputted from the signal electrode is made easy to be applied to the earth electrodes arranged on the left and right side of the signal electrode, thereby suppressing an emission of a high frequency wave to the side of the substrate.

The optical frequency comb signal generator of the present invention comprise bias signal system. The bias signal system generates the first bias signal (12) and the second bias signal (13). The first bias signal is added to the first wave-guide and the second bias signal is added to the second wave-guide. The bias signal system control the bias voltage added to two arms. The bias adjustment electrode is an electrode for controlling a phase of light propagating thorough the two arms by controlling bias voltage between two arms. Direct current signal or low frequency signal is preferably applied to the bias adjustment electrode. The term "low frequency" means frequency of, for example, 0 Hz to 500 MHz. A phase modulator for adjusting a phase of an electric signal is preferably provided at the output of the signal source of this low frequency signal in order to be able to control a phase of an output signal.

The modulation electrode and the bias electrode may be implemented by different two electrodes and may be implemented by one electrode which acts as the modulation electrode and the bias electrode. In other words, the modulation electrode may be connected to a bias circuit, a power circuit, which mix DC signal and RF signal and supply the mixed signals to a specific electrode.

It is preferred that the optical frequency comb signal generator comprises a controller which is electrically or optically connected with signal sources for each electrodes. The controller makes it possible to control timing and phase of signals added to electrodes suitably. Such a controller acts to adjust the modulation timing of signal which is added to the modulation electrode and bias adjusting electrode. In other words, it adjust the modulation of each electrode is executed considering the transportation period. The adjusting time should be arranged considering the distance among each of electrodes.

[Method for Manufacturing an Optical Frequency Comb Signal Generator]

The optical frequency comb signal generator of the present invention comprises a substrate, waveguides formed on the substrate, electrodes, a signal source, a measuring part, a control part and the like. As a forming method of an optical waveguide, a publicly know forming method of the internal diffusion method such as the titanium diffusion method or a proton exchange method and the like can be used. In other words, the optical FSK modulator of the present invention, for example, can be manufactured by the following method. Firstly, an optical waveguide is formed by patterning titanium on the surface of a wafer of lithium niobate by photolithography and spreading titanium by thermal diffusion method. This is subject to the following conditions. The thickness of titanium is 100 to 2000 angstrom, diffusion temperature is 500 to 2000° C., and diffusion time is 10 to 40 hours. An insulating buffer layer of silicon dioxide (thickness of 0.5 to 2 μm) is formed on a principle surface of the substrate. Secondly, an electrode with metal plating with thickness of 15 to 30 μm is formed on the buffer layer. And lastly, the wafer is cut off. By these processes, an optical modulator formed with titanium-diffused waveguide is manufactured.

The optical frequency comb signal generator, for example, can be manufactured by the following process. A waveguide can be provided on the substrate surface of lithium niobate by proton exchange method or titanium thermal diffusion method. For example, Ti metal stripe (length of few μm) is formed in a row on an LN substrate by photolithographic technique. Subsequently, Ti metal is diffused into the substrate by exposing the LN substrate to heat (about 1000° C.). Through this process, a waveguide can be formed on an LN substrate.

Also, an electrode is manufactured in the same way as the above process. For example, in the same way as a formation of an optical waveguide, by using photolithography technique, an electrode can be formed on both sides of a plurality of waveguides which are formed in the same breadth, the electrode being formed so that the gap between neighboring electrodes is about 1 μm to 50 μm.

In case of manufacturing an electrode using silicon substrate, the manufacturing process, for example, is as follows. A lower cladding layer is disposed on a silicon (Si) substrate by the flame hydrolysis deposition method, the lower cladding layer being composed mostly of silicon dioxide ($SiO_2$).

And then a core layer is deposed, the core layer being composed mostly of silicon dioxide ($SiO_2$) to which germanium dioxide ($GeO_2$) is added as a dopant. Subsequently, vitrification is performed in an electric furnace. And then, an optical waveguide is formed by etching and an upper cladding layer is disposed, the upper cladding layer being composed mostly of silicon dioxide ($SiO_2$). And then, a thin-film heater thermooptic intensity modulator and a thin-film heater thermooptic phase modulator are formed on the upper cladding layer.

[Condition for Spectrum Flatness]

Figure 2:
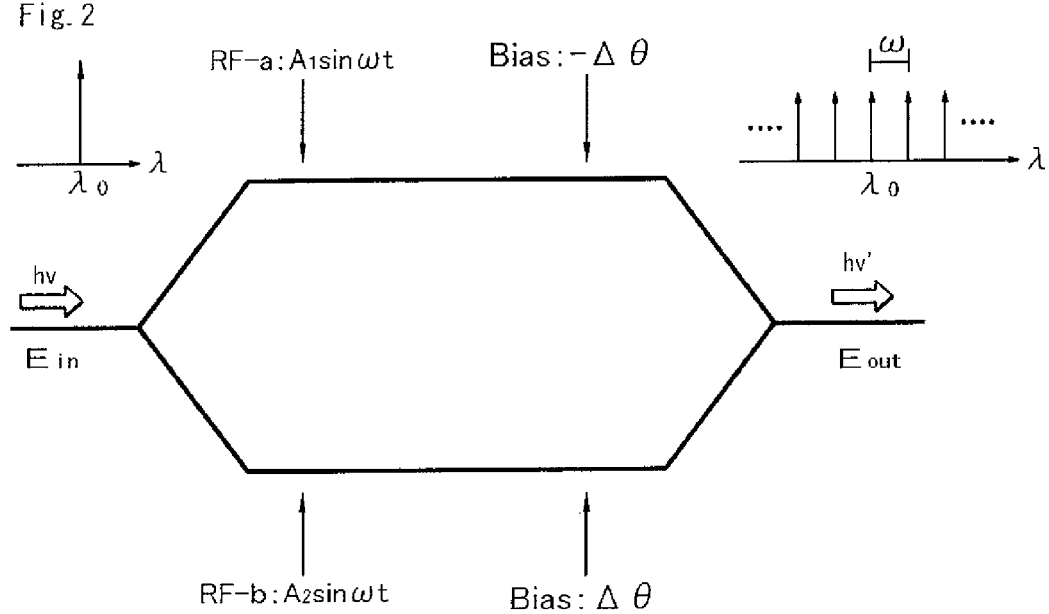
FIG. 2 is a drawing which explains the concept of generating optical frequency comb signals by the optical frequency comb signal generator of the present invention.

FIG. 1 depict that the optical frequency comb signal generator can generate an optical frequency comb signal with spectral flatness. FIG. 2 shows the concept of the optical frequency comb generation. In the proposed optical frequency comb signal generator, input continuous-wave (CW) lightwave is chirped modulated with a conventional Mach-Zehnder modulator, which is driven by in-phase sinusoidal signals with different amplitudes.

Suppose that the driving signals that drives both arms are RF-a and RF-b. The amplitudes of RF-a and RF-b are supposed to be $A_a$, which corresponds to $A_1$, and $A_b$, which corresponds to $A_2$, respectively. Further, the modulation frequency is supposed to be ω. Then RF-a and RF-b are expressed as following equation (1), $$RF\text{-}a = A_a \sin \omega t, RF\text{-}b = A_b \sin \omega t \tag{1}$$

When amplitude of a signal inputted into the Mach-Zhender modulator is $E_{in}$, output optical field at the output of the Mach-Zhender modulator, $E_{out}$, is represented by the following formula (2). In the equation (2), $J_k(\cdot)$ denotes the kth-order Bessel function.

$$E_{out} = \frac{1}{2} E_{in} \sum_{k=-\infty}^{\infty} [J_k(A_1) e^{jk\omega t + \theta_1} + J_k(A_2) e^{jk\omega t + \theta_2}], \tag{2}$$

Power conversion efficiency $\eta_k$ is defined as compare rate $P_k$ to $P_{in}$, $P_k$ denotes the intensity of the $k^{th}$ frequency comb component and $P_{in}$ denotes the intensity of the input signal. For large amplitudes of the driving signals. $A_i(t)$ (where i=a or b), power conversion efficiency $\eta_k$ from the input continuous wave light to each harmonic mode can be asymptotically approximated as explained in equation (3).

$$\eta \equiv \frac{P_k}{P_{in}}$$

$$= \frac{1}{2\pi \bar{A}} \left[ 1 + \cos(2\Delta\theta)\cos(2\Delta A) + \{\cos(2\Delta\theta) + \cos(2\Delta A)\}\cos\left\{2\bar{A} - \frac{2k\pi + 1}{2}\right\} \right]$$

where /A(A bar), ΔA and Δθ are defined as following equation (4).

$$/A \equiv (A_1 + A_2)/2, \Delta A \equiv (A_1 - A_2)/2, \Delta\theta \equiv (\theta_1 - \theta_2)/2 \tag{4}$$

To make the comb flat in the optical frequency domain, the intensity of each mode should be independent of k. From Eq. (3), the driving condition becomes $$\Delta A + \Delta\theta = \pi/2 \tag{5}$$

under which frequency components of the generated optical frequency comb should have the same intensity. In other words, to obtain We call this equation the "flat spectrum condition."

Maximum Conversion Efficiency

Under this condition, the intrinsic conversion efficiency excluding insertion loss due to impairment of the modulator is theoretically derived from equations (3) and (5), resulting in the following equation (6).

$$\eta_k = \frac{1 - \cos 4\Delta\theta}{4\pi A} \quad (6)$$

Which means that the conversion efficiency is maximized when the following condition is met.

$$\Delta A = \Delta\theta = \pi/4 \quad (7)$$

Maximum conversion efficiency when meeting the equation (7) is represented as following equation (8).

$$\eta_{k,max} = \frac{1}{2\pi A} \quad (8)$$

As explained above, the condition to generate a optical frequency comb signal with spectrum flatness is equation (5), $\Delta A + \Delta\theta = \pi/2$. Further, the condition for the generate efficiency of the optical frequency comb signal generator being best with meeting the above condition of spectral flatness is equation (7), $\Delta A = \Delta\theta = \pi/4$, which is the most effective flatness condition. Meaning of the Equation (7) is that a Mach-Zhender is biased at $2/\pi$ point and maximum phase difference of phase shift induced by driving sine wave signal, RF-a and RF-b, is $\pi$. Note that this is the optimal driving condition for flatly generating an optical frequency comb with the maximum conversion efficiency. Hereafter, we call this equation the "maximum-efficiency condition" for ultraflat comb generation.

[Explanation of How to Act the Generator]

The fundamental movement of the optical frequency comb signal generator of the present invention is depicted in the FIG. 2. The apparatus adds driving signals RF-a and RF-b and bias signals $\Delta\theta$ and $-\Delta\theta$. When the central wavelength of the optical input signal is $\lambda_0$, then the optical frequency comb signal outputted from the apparatus can generate the optical frequency comb signal that have plurality of frequency components with interval based on the frequency of the driving signal which starts from the $\lambda_0$.

[Optical Pulse Generator]

Third aspect of the present invention is directed to optical pulse generator. The optical pulse generator equips the above explained optical frequency comb signal generator and act based on the method for generating optical frequency comb signal. The third aspect of the present invention is directed to an optical pulse generator comprises any of the above described optical frequency comb signal generator. The apparatus for generating optical pulse comprises an optical frequency comb signal generator, and means for controlling optical phase. The optical frequency comb signal generator comprises a wave-guide portion (8), a driving signal system (11), and a bias signal system (14). The wave-guide portion comprises an optical input port (2), a branching port (3), a first wave-guide (4), a second wave-guide (5), and a couple portion (6). The branching port (3) is configured to branch light from the optical input port. On the first wave-guide (4), one of lights branched by the branching port (3) propagates. On the second wave-guide (5), other light branched by the branching port (3) propagates. The couple portion (6) couples a light signal outputted from the first wave-guide and a light outputted from the second wave-guide (5). The driving signal system (11) is configured to obtain a first driving signal (9) and a second driving signal (10). The first driving signal (9) drives the first wave-guide. The second driving signal (10) drives the second wave-guide. The bias signal system (14) is configured to obtain bias signals (12, 13) added to the first wave-guide and the second wave-guide. The driving signal system (11) and the bias signal system (14) drive the first driving signal (9), the second driving signal (10) and the bias signals (12, 13) in accordance with the following equation (I).

$$\Delta A + \Delta\theta = \pi/2 \quad (I)$$

(wherein the $\Delta A$ and the $\Delta\theta$ are the same as above.)

Further, the optical pulse generator has a phase control means for controlling the phase of each of frequency components of the optical frequency comb signal so that the apparatus can generate optical pulse signal. To control properly the phase of the modulation signal which is added the both arms makes it possible to control the phase of each of the frequency components of the optical frequency comb signal. In other words, one example of the phase control means is a control apparatus which controls the signals outputted from power source of the driving signal system. The means for controlling optical phase controls phase of each of frequency components which composes the optical frequency comb signal.

An optical comb can generates the optical pulse signal based on its band. Thus the optical frequency comb signal generator may act as optical pulse generator which generates plurality of optical pulses with different frequencies with super high quality. It is true that the method for generating the optical pulse signal using the optical comb generator but the optical pulse has a meritorious effect as explained above because the generator of the present invention comprises the above mentioned optical frequency comb signal generator. Further, the optical pulse generator of the present invention may have any elements as described above and the generator act including any steps as described above.

A preferred embodiment of the third aspect of the present invention is directed to the an optical pulse generator which controls not only phase of each component composing the optical frequency comb signals but also controls intensity of each component composing the optical frequency comb signals.

The apparatus for generating optical pulse of this embodiment basically comprises an optical frequency comb signal generator, means for controlling optical phase and means for controlling optical intensity. The optical frequency comb signal generator comprises a wave-guide portion (8), a driving signal system (11), and a bias signal system (14). The wave-guide portion comprises an optical input port (2), a branching port (3), a first wave-guide (4), a second wave-guide (5), and a couple portion (6). The branching port (3) is configured to branch light from the optical input port. On the first wave-guide (4), one of lights branched by the branching port (3) propagates. On the second wave-guide (5), other light branched by the branching port (3) propagates. The couple portion (6) couples a light signal outputted from the first wave-guide and a light outputted from the second wave-guide (5). The driving signal system (11) is configured to obtain a first driving signal (9) and a second driving signal (10). The first driving signal (9) drives the first wave-guide. The second driving signal (10) drives the second wave-guide. The bias signal system (14) is configured to obtain bias signals (12, 13) added to the first wave-guide and the second wave-guide. The driving signal system (11) and the bias signal system (14)

drive the first driving signal (9), the second driving signal (10) and the bias signals (12, 13) in accordance with the following equation (I).

$$\Delta A + \Delta \theta = \pi/2 \tag{I}$$

(wherein the ΔA and the Δθ are the same as above.)

The means for controlling optical phase controls phase of each of frequency components which composes the optical frequency comb signal. The means for controlling optical intensity controls intensity of each of frequency components which composes the optical frequency comb signal.

To control the intensity of each frequency components is attained, for example, by controlling the intensity of modulation signal which is added to the both arms. The example of the means for controlling the intensity if control apparatus that controls the signals outputted form the power source of the driving signal system. Further, the optical pulse generator of the present invention may have any elements as described above and the generator act including any steps as described above.

It is true that the method for generating the optical pulse signal using the optical comb generator but the optical pulse has a meritorious effect as explained above because the generator of the present invention comprises the above mentioned optical frequency comb signal generator.

[Experiment 1]

Figure 3:
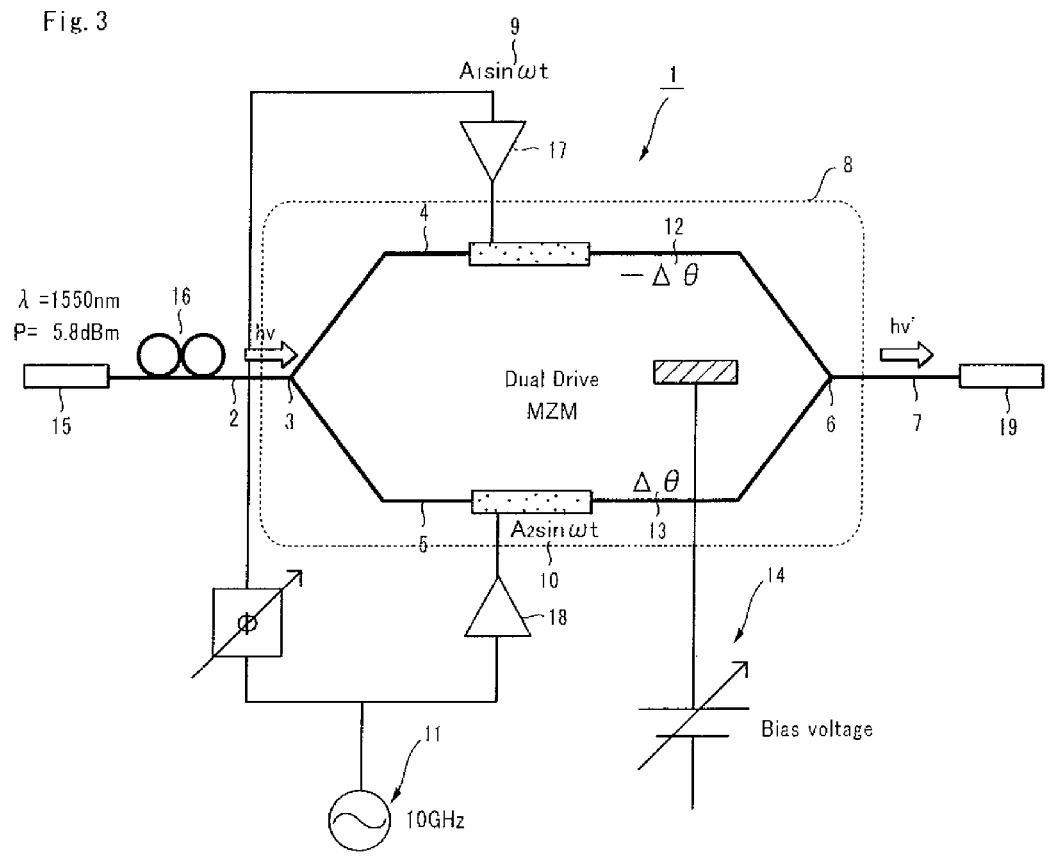
FIG. 3 depicts a schematic diagram of an experimental apparatus to prove the fact that the optical frequency comb signal generator of the present invention can generate optical frequency comb signals with spectral flatness.

FIG. 3 is a schematic diagram of the experimental setup to show that the optical frequency comb generator of the present invention can generate the comb signals with super spectrum flatness. In the FIG. 3, the same element numerals are indicated for the same element as in the FIG. 1. In the FIG. 3, the element numeral 15 indicates optical source, the numeral 16 indicates polarize controller, PC, and the numerals 17 and 18 indicate amplifiers, and the numeral 19 indicates spectrum analyzer. As shown in the FIG. 3, the optical frequency comb generator has DFB laser to generate CW light and an optical comb generation mechanism which comprises Mach-Zhender modulator. Further the optical comb generation mechanism comprises Mach-Zhender modulator which is used to modulate the optical signal outputted form CW light source, PC to control polarization of signal outputted from the CW light source, RF signal source, separator which separates output signals form the RF signals, phase shifter which controls the phase of signal from RF signal source, and amplifier which amplifies the RF signals from the signal source. The optical frequency comb generator is connected to the optical spectrum analyzer to evaluate the output spectrum from the apparatus. Please note that the condition of optical system and power source system is controlled to be the maximum efficient flatness condition.

A CW light was generated from the LD, whose centre wavelength and intensity of the LD was 1550 nm and 5.8 dBm, respectively. The CW light was introduced into the modulator through a polarization controller to maximize modulation efficiency. Then the light is fed into the Mach-Zhender modulator.

The Mach-Zehnder modulator was dual-driven with sinusoidal signal with different amplitudes (RF-a, RF-b). The RF sinusoidal signal at a frequency of 10 GHz was generated form a synthesizer, divided half with a hybrid coupler, amplified with microwave boosters, and then fed to the each modulation electrode of the modulator. The apparatus comprises a Z-cut dual-drive type Mach-Zhender modulator which has modulation electrodes on both arms. The half wavelength voltage of the Mach-Zhender modulator is set to 5.4V and DC-bias is set to π/4 point. Synthesizer generates a sign signal which drives the modulator and the repetitious period of the signal was set to 10.0 GHz.

RF separator separated the sign signal outputted from the synthesizer. After RF amplifier amplified the separated signals to have enough amplitude, the separated signals were inputted to each of the modulation electrodes. The intensities of RF-a and RF-b injected into the electrodes were controlled by a variable attenuator implemented in the feeder lines to the electrodes. The RF intensities were 25 dBm and 27 dBm, respectively. The phase difference between RF-a and RF-b was aligned to be zero by using a mechanically tunable delay line, which was placed in the feeder cable for RF-a. The modulation spectra obtained from the frequency comb generator were measured with an optical spectrum analyzer.

The obtained spectrum of the optical frequency comb is shown in FIG. 4. FIG. 4 shows the optical spectra of the generated frequency comb. FIG. 4(*a*) shows the output spectrum when the modulator was driven only with RF-a under the condition that Δθ=π/4; FIG. 4(*b*) shows the output spectrum when the modulator was driven only with RF-b under the condition that Δθ=π/4; FIG. 4(*c*) shows the output spectrum when the modulator was dual-driven with RF-a and RF-b under the condition that ΔA=Δθ=π/4.

As shown in the FIGS. 4(*a*) and 4(*b*), in the single-driven case, the intensity of the each mode at the frequency of rippled along the wavelength axis. On the other hand, as shown in the FIG. 4(*c*), the modulation spectrum had good flatness when the modulator was dual driven under the optimal condition. The frequency spacing and 1-dB spectral width of the generated comb were 10 GHz and 120 GHz, respectively. The optical conversion loss from the input CW light to the average power of the generated comb was as low as 18 dB. Considering the loss of insert, the result shows that to meet the maximum efficiency flatness condition bring the apparatus with an ideal spec.

INDUSTRIAL APPLICABILITY

The present invention can apply to a multi wavelength optical source for optical Wavelength Division Multiplexing transmitting system and short pulse optical source for super high speed optical transmission and optical measurement. Further, the present invention can apply to generate standard optical signal for measurement of absolute frequency, long-distance supply for signals within the frequency band of micro-wave or millimeter wave, and control signal for an array antenna which is used for an Astronomical Observation system like wireless telescope.

The invention claimed is:

1. An optical frequency comb generator, comprising:
   a wave-guide portion;
   a driving signal system; and
   a bias signal system,
   wherein the wave-guide portion having:
   an optical input port;
   a branching port configured to branch light from the optical input port;
   a first wave-guide, on which one of lights branched by the branching port propagates;
   a second wave-guide, other light branched by the branching port propagates; and
   a couple portion couples a light signal outputted from the first wave-guide and a light outputted from the second wave-guide, wherein the driving signal system is configured to obtain a first driving signal which drives the first wave-guide and a second driving signal which drives the second wave-guide, wherein the bias signal system is configured to obtain bias signals added to the first wave-guide and the second wave-guide, wherein the driving signal system and the bias signal system drive the first driving signal, the second driving signal and the bias signals in accordance with the following equation (II):

$$\Delta A = \Delta \theta = \pi/4 \quad \text{(II)},$$

wherein the $\Delta A$ and the $\Delta \theta$ are $(A_1-A_2)$ and $(\theta_1-\theta_2)/2$, respectively, $A_1$ and $A_2$ are amplitudes of optical phase shift signals of the first driving signal and the second driving signal, respectively, $\theta_1$ and $\theta_2$ are optical phase shifts induced by difference in wavelength and bias signal within the first wave-guide and the second wave-guide, respectively.

2. The optical frequency comb signal generator in accordance with claim 1, wherein the wave-guide portion comprises a Mach-Zhender wave-guide.

3. A method for generating optical frequency comb signal by means of an optical frequency comb signal generator,
wherein the optical frequency comb signal generator comprises:
a wave-guide portion; a driving signal system; and a bias signal system,
wherein the wave-guide portion having:
an optical input port;
a branching port configured to branch light from the optical input port;
a first wave-guide, on which one of lights branched by the branching port propagates;
a second wave-guide, other light branched by the branching port propagates; and
a couple portion couples a light signal outputted from the first wave-guide and a light outputted from the second wave-guide,
wherein the driving signal system is configured to obtain a first driving signal which drives the first wave-guide and a second driving signal which drives the second wave-guide,
wherein the bias signal system is configured to obtain bias signals added to the first wave-guide and the second wave-guide,
wherein the driving signal system and the bias signal system drive the first driving signal, the second driving signal and the bias signals in accordance with the following equation (II):

$$\Delta A = \Delta \theta = \pi/4 \quad \text{(II)},$$

wherein the $\Delta A$ and the $\Delta \theta$ are $(A_1-A_2)/2$ and $(\theta_1-\theta_2)/2$, respectively, $A_1$ and $A_2$ are amplitudes of optical phase shift signals of the first driving signal and the second driving signal, respectively, $\theta_1$ and $\theta_2$ are optical phase shifts induced by difference in wavelength and bias signal within the first wave-guide and the second wave-guide, respectively.

4. The method for generating optical frequency comb signal in accordance with claim 3, wherein the wave-guide portion comprises a Mach-Zhender wave-guide.

5. An apparatus for generating optical pulse, comprising an optical frequency comb signal generator, and means for controlling optical phase,
wherein the optical frequency comb signal generator comprises:
a wave-guide portion; a driving signal system; and a bias signal system,
wherein the wave-guide portion having:
an optical input port;
a branching port configured to branch light from the optical input port;
a first wave-guide, on which one of lights branched by the branching port propagates;
a second wave-guide, other light branched by the branching port propagates; and
a couple portion couples a light signal outputted from the first wave-guide and a light outputted from the second wave-guide,
wherein the driving signal system is configured to obtain a first driving signal which drives the first wave-guide and a second driving signal which drives the second wave-guide,
wherein the bias signal system is configured to obtain bias signals added to the first wave-guide and the second wave-guide,
wherein the means for controlling optical phase controls phase of each of frequency components which composes the optical frequency comb signal,
wherein the driving signal system and the bias signal system drive the first driving signal, the second driving signal and the bias signals in accordance with the following equation (II):

$$\Delta A = \Delta \theta = \pi/4 \quad \text{(II)},$$

wherein the $\Delta A$ and the $\Delta \theta$ are $(A_1-A_2)/2$ and $(\theta_1-\theta_2)/2$, respectively, $A_1$ and $A_2$ are amplitudes of optical phase shift signals of the first driving signal and the second driving signal, respectively, $\theta_1$ and $\theta_2$ are optical phase shifts induced by difference in wavelength and bias signal within the first wave-guide and the second wave-guide, respectively.

6. An apparatus for generating optical pulse, comprising an optical frequency comb signal generator, means for controlling optical phase and means for controlling optical intensity,
wherein the optical frequency comb signal generator comprises:
a wave-guide portion; a driving signal system; and a bias signal system,
wherein the wave-guide portion having:
an optical input port;
a branching port configured to branch light from the optical input port;
a first wave-guide, on which one of lights branched by the branching port propagates;
a second wave-guide, other light branched by the branching port propagates; and
a couple portion couples a light signal outputted from the first wave-guide and a light outputted from the second wave-guide,
wherein the driving signal system is configured to obtain a first driving signal which drives the first wave-guide and a second driving signal which drives the second wave-guide,
wherein the bias signal system is configured to obtain bias signals added to the first wave-guide and the second wave-guide,
wherein the means for controlling optical phase controls phase of each of frequency components which composes the optical frequency comb signal, wherein the means for controlling optical intensity controls intensity of each of frequency components which composes the optical frequency comb signal, wherein the driving signal system and the bias signal system drive the first driving signal, the second driving signal and the bias signals in accordance with the following equation (II):

$$\Delta A = \Delta\theta = \pi/4 \qquad (II),$$

wherein the $\Delta A$ and the $\Delta\theta$ are $(A_1-A_2)/2$ and $(\theta_1-\theta_2)/2$, respectively, $A_1$ and $A_2$ are amplitudes of optical phase shift signals of the first driving signal and the second driving signal, respectively, $\theta_1$ and $\theta_2$ are optical phase shifts induced by difference in wavelength and bias signal within the first wave-guide and the second wave-guide, respectively.

* * * * *